April 23, 1968     S. E. GROOTHIUS     3,380,072

RECORDING COULOMETER

Filed March 21, 1966     3 Sheets-Sheet 1

INVENTOR
STANLEY E. GROOTHIUS

ATTORNEY

April 23, 1968  S. E. GROOTHIUS  3,380,072
RECORDING COULOMETER

Filed March 21, 1966  3 Sheets-Sheet 3

INVENTOR
STANLEY E. GROOTHIUS
BY
ATTORNEY

United States Patent Office 3,380,072
Patented Apr. 23, 1968

3,380,072
RECORDING COULOMETER
Stanley E. Groothius, Oak Ridge, Tenn., assignor to Union Carbide Corporation, a corporation of New York
Filed Mar. 21, 1966, Ser. No. 535,907
3 Claims. (Cl. 346—107)

ABSTRACT OF THE DISCLOSURE

A recording device for providing a permanent photographic record of data, e.g. temperature variations, employing a coulometer and an arrangement of light sources controlled by sensing means.

---

The invention described herein was made in the course of or under a contract with the U.S. Atomic Energy Commission.

The present invention is directed to recording devices whereby a permanent record of the temperature or other variable at a remote location can be conveniently obtained. More particularly, the present invention is related to a recording device which provides a permanent photographic record of temperature or other parameter through the use of a unique arrangement of light sources and a coulometer of the type disclosed in United States Patent 3,045,178, the disclosure of which is incorporated herein by reference.

In present day technology, particularly in the field of aerospace, it is a common task to obtain permanent records of temperature, radiation and other parameters and variables at remote locations and for particular times. For example, an accurate permanent record of the temperature in a particular part of a space vehicle may be desired at a particular time during its flight program. Consequently, a light weight, compact, rugged and accurate recording device is a necessity.

Accordingly, there is provided in accordance with the present invention the combination of a light source, means for turning the light on and off in accordance with the value of a particular parameter of interest, a coulometer of the type described in the aforementioned U.S. Patent 3,045,178 and a light responsive photographic substrate which provides the desired permanent photographic record.

Figure 1:
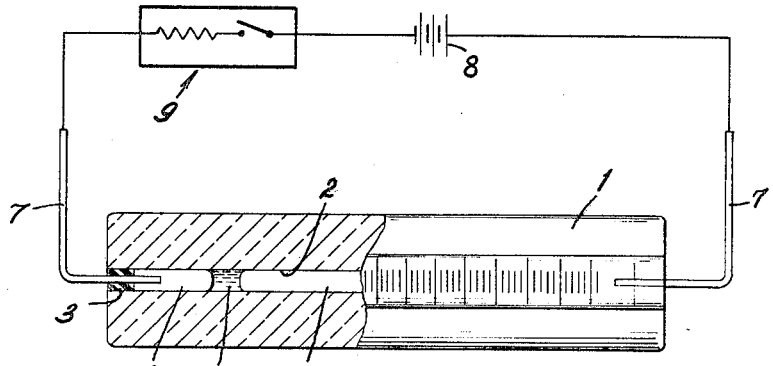
Figure 3:
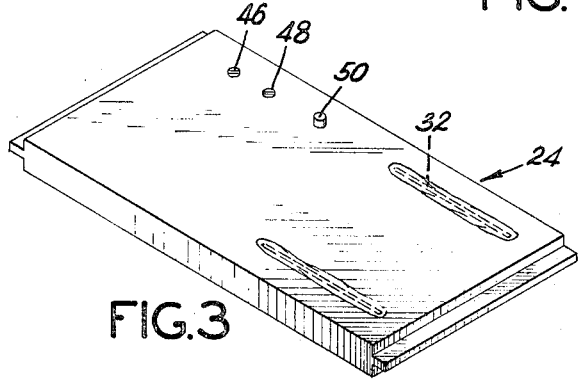
Figure 2:
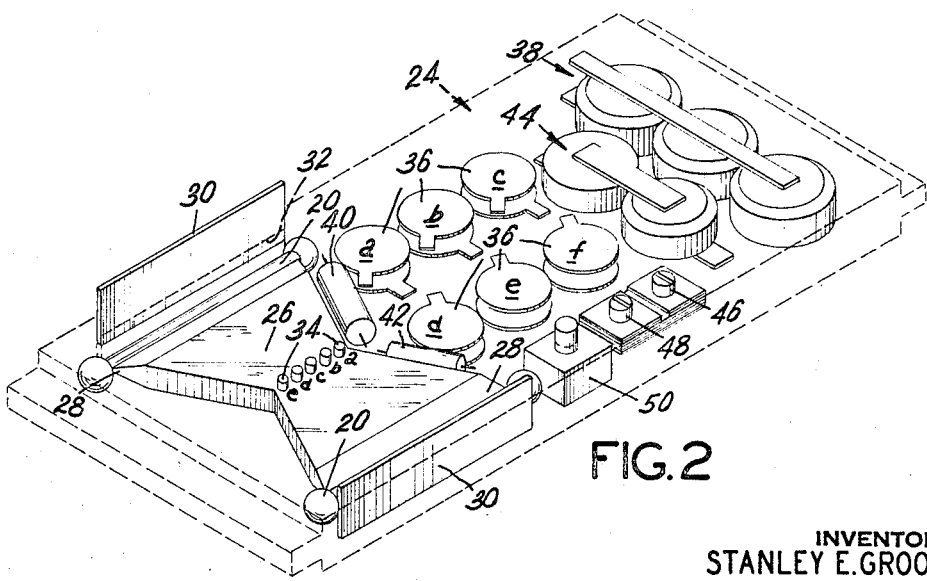
Figure 6:
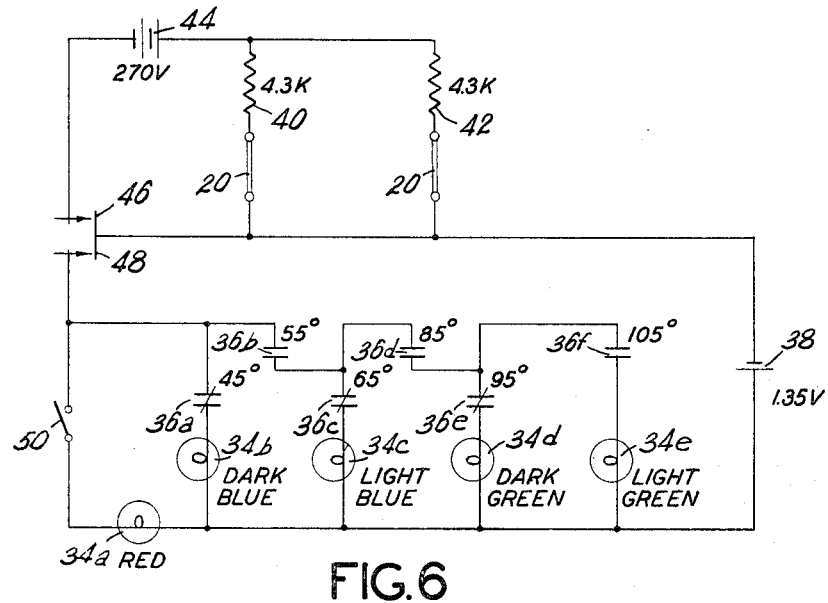
Figure 5:
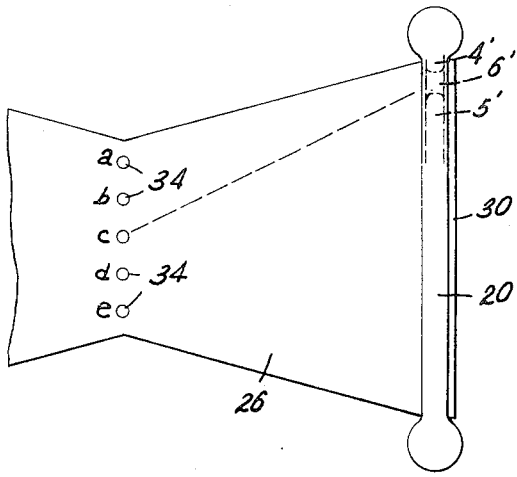
Figure 4:
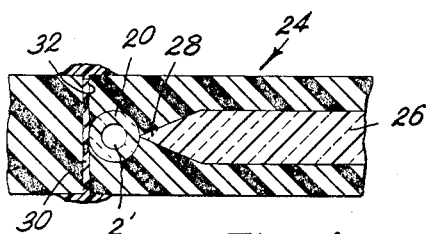

A full description of the invention is given below with reference to the drawings in which FIGURE 1 shows the general arrangement of a coulometer employed in the recording device of the present invention and which is disclosed in U.S. Patent 3,045,178, FIGURE 2 shows an embodiment of the recording device of the present invention, FIGURE 3 shows somewhat schematically a practical form for the assembled recording device of this invention, FIGURE 4 shows in a fragmentary view a portion of the device of FIGURE 3 and indicates the light path relationship between a light source, coulometer, and photographic recording substrate, FIGURE 5 illustrates in more detail the manner of light transmission to a coulometer in the device of FIGURE 2, FIGURE 6 shows a suitable electrical circuit for the device of FIGURE 3, and FIGURES 7, 8 and 9 show, somewhat schematically, various views of a preferred embodiment of the present invention.

With reference to FIGURE 1 of the drawing, and to United States Patent 3,045,178, this figure shows a coulometer of the general type that can be used in the present invention and the numeral 1 therein indicates a tube of transparent, nonconductive material such as glass, polystyrene or transparent epoxy resins. A bore 2 of substantially uniform cross-section extends from one end of the tube to the other and is suitably sealed at both ends by plugs 3 or simply by heat-sealing the glass.

Prior to sealing the tube, there are placed within the bore two columns 4 and 5 of liquid metal, which is suitably mercury. As shown, each of the columns extends from one end of the tube toward the other end but do not meet. A small quantity or droplet of a suitable electrolyte solution fills the space or gap 6 between the inmost ends of the columns so that it is in good conductive contact with both columns. The electrolyte is a water solution of one or more metal salts and is consequently transparent and will transmit light.

Each mercury column is provided with a conductive connection 7 at the end of the column opposite the electrolyte to the exterior of the tube 1. When the coulometer is connected in series with a source of potential such as a battery 8 and a device 9, such as a resistive element, which when connected in the circuit draws constant current, a quantity of mercury goes into solution with the electrolyte from one column and a like quantity goes out of solution onto the other column. The entire volume of transparent electrolyte 6 is thus displaced along the bore for a distance which is directly related to the time that the current flows. Thus, when the coulometer is connected to a source of potential, the space or gap between the mercury column acts as a clock and moves at a rate which is determined by the current applied and the diameter of the bore.

In the present invention, with particular reference to FIGURE 2, coulometers 20, which are generally similar to that of FIGURE 1, are shown "potted," i.e. embedded, in an opaque epoxy resin shaped in the form of a wafer which is indicated at 24 in the figures of the drawing. Also embedded in the opaque wafer 24 is a plate 26 of light transmitting material such as Plexiglas[1] which has two parallel knife edges 28 which are arranged in light transmitting relation with the coulometers 20 as indicated more specifically in FIGURE 4. As shown representatively in FIGURE 4, the capillary or bore portion 2' of each coulometer is positioned parallel and flush against the associated knife edge 28 and strips of color photographic film 30 are positioned in contact with the coulometers in slots 32 in wafer 24. When the film is inserted these slots are covered with an opaque material. Five different colored miniature electric lamps 34—a through e—are mounted in the plate 26 and are substantally surrounded thereby, and are connected to six miniature thermostats 36—a through f—and battery supply 38 in the circuit arrangement shown in FIGURE 6. FIGURE 6 also shows coulometers 20 connected to resistive loads 40 and 42 and battery supply 44 and shows next to the respective thermostats the temperatures at which they will go to the "on" position when exposed to increasing temperatures.

The arrangement of FIGURE 2 as previously described, which is completely potted and coated with opaque material, can be seen to constitute a dual unit which while not essential, substantially enhances the reliability of the device.

In operation, the wafer of opaque epoxy resin 24 containing the assembly aforedescribed is suitably installed in the environment to be monitored, and at time zero, switches 46 and 48 are closed by a set screw adjustment. With reference to FIGURE 6, this causes the coulometers 20 to be energized and the space 6' between the mercury columns 4' and 5' is caused to move from its initial position and, depending upon the temperature to

---

[1] Trademark of Rohm & Haas Company.

which the wafer 24 and the embedded thermostats are exposed, one of the lamps 34 will be energized and the light therefrom will pass through plate 26, which serves as a light pipe, through the knife edge 28, and through the gap 6' to the associated film strip 30. The film strip when removed and developed will show the following record for increasing temperatures:

TABLE I

| Temperature (deg.) | Developed Film Strip Shows— | |
|---|---|---|
| Below 45 | Dark blue line | 36-a closed; 36-b open. |
| 45 to 55 | No line | 36-a and 36-b open. |
| 55 to 65 | Light blue line | 36-b and 36-c closed. |
| 65 to 85 | No line | 36-b closed; 36-c and 36-d open. |
| 85 to 95 | Dark green line | 36-b and 36-d closed, and 36-e closed. |
| 95 to 105 | No line | 36-b and 36-d closed; 36-e open. |
| Above 105 | Light green | 36-b, 36-d and 36-f closed. |

Lamp 34–a, as shown in FIGURE 6, is controlled by an "event marker" switch 50 which is spring loaded to the "on" position and lights when switches 46 and 48 are closed to provide a reference on the film. The switch 50 is turned off before temperature measurements begin by an actuator (not shown). Consequently, the developed film will provide a permanent record which defines the temperature to which the wafer 24 is exposed during a particular time interval.

Figure 7:
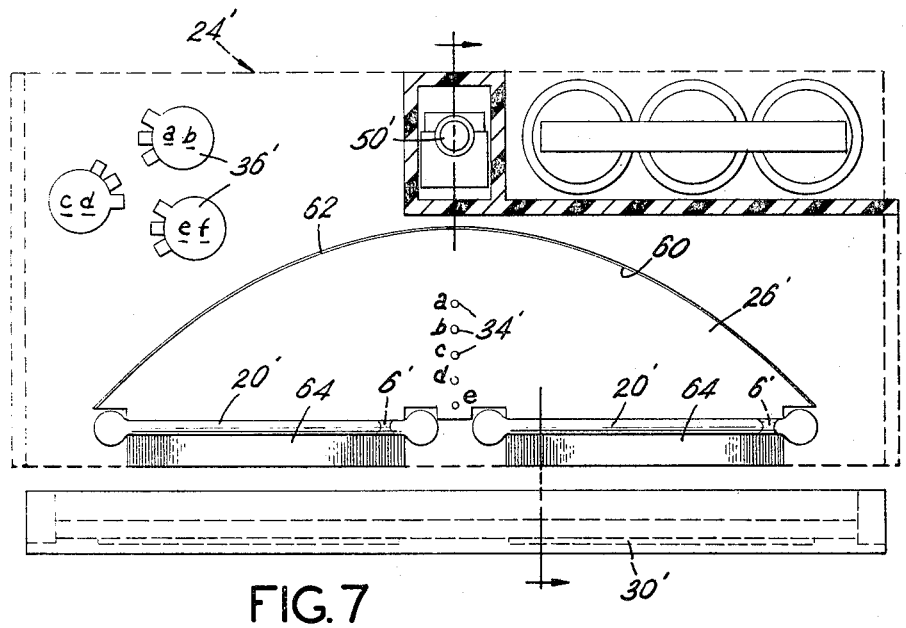
Figure 8:
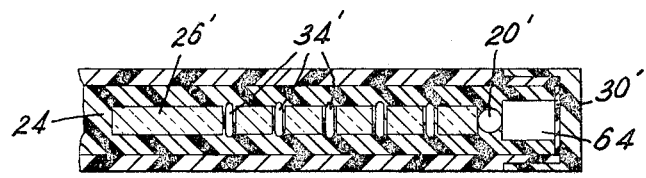
Figure 9:
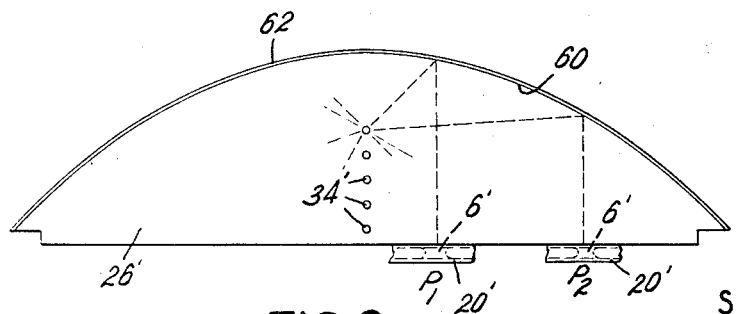

With reference to FIGURES 7, 8 and 9 of the drawing, these views illustrate a preferred embodiment of the present invention showing epoxy wafer 24' containing a modified light transmitting plate 26' having a parabolic contour 60 which is provided with a light reflecting edge 62 which can for example be a coating of aluminum paint. The lamps 34' are arranged as close to the focal point of the parabolic contour as is practically possible and along the axis of the parabola and the coulometers 20' are shown arranged perpendicular to the axis of the parabola. With an arrangement of this type, which is suitably energized along the lines of the circuit of FIGURE 6, improved operation is obtained since substantially the same amount of light passes through the coulometer gap 6' regardless of the relative positions of the light source and gap. Also, the intensity of the light transmitted to the film remains substantially constant regardless of the position of the coulometer gap. Consequently the film record obtained is of uniform density and light scattering, which can occur when light passes at an oblique angle through the coulometer gap, is avoided thereby increasing the accuracy of the film record.

As is further shown in FIGURES 7 and 8, a collimator 64 is provided in light transmitting contact with the coulometers and film as an aid in eliminating light scattering. The collimator can be conveniently fabricated by coating squares of cellulose acetate, about 0.010 inch thick, with an opaque epoxy and then glueing the squares together to form a stock as shown in the drawing.

A particular advantage of the present invention is that it can readily be produced in a very rugged form and requires very little space. For example, the wafer 24 containing the assembly described above can be as small as 0.2 x 1.65 x 3.59 inches and can be designed to withstand a 40–g shock load, a 15–g acceleration, a $10^{-2}$ p.s.i. vacuum, temperatures up to 160° F. and 100% relative humidity.

What is claimed is:
1. A recording device comprising
   (a) a plurality of different colored light sources
   (b) sensing means for turning on and off a particular light source depending on the relative value of a stimulus to which the sensing means is responsive
   (c) a coulometer in light receiving relation with each of said light sources, said coulometer being adapted to be connected to a source of electrical potential and comprising a body member capable of transmitting light said body member having a bore which contains therein two columns of liquid metal, each of which extends from an end of the bore toward the other column such that a space not occupied by column metal exists between the adjacent ends of the column, which space moves along the body member of the coulometer at a determinable rate as the length of columns change in relation to the charge flowing therethrough from said source of electric potential
   (d) a light responsive recording means in the form of a color sensitive photographic substrate arranged in relation to each of said light source and coulometer such that said recording means is exposed to light which is transmitted by any of said light sources and which passes through the space between the columns of the coulometer thereby causing a permanent record to be made of the duration and color of light exposure on said light recording means.
2. A recording device in accordance with claim 1 wherein a light channeling member is arranged substantially surrounding the different light sources and in contact with the body member of the coulometer.
3. A recording device in accordance with claim 2 wherein the light channeling member is in the form of a plate of light transmitting material having a light reflecting parabolic contour over a portion of its periphery opposite the coulometer and the plurality of multicolored lights are located close to the focal point along the axis of the parabola.

References Cited
UNITED STATES PATENTS

| | | | |
|---|---|---|---|
| 425,270 | 4/1890 | Thompson | 346—108 |
| 848,083 | 3/1907 | Armstrong et al. | 346—107 |
| 997,651 | 7/1911 | Bingham | 346—107 |
| 3,045,178 | 7/1962 | Corrsin | 324—68 |

RICHARD B. WILKINSON, *Primary Examiner.*

J. W. HARTARY, *Assistant Examiner.*